US008842159B2

(12) United States Patent
Lu et al.

(10) Patent No.: US 8,842,159 B2
(45) Date of Patent: Sep. 23, 2014

(54) ENCODING PROCESSING FOR CONFERENCING SYSTEMS (75) Inventors: Mei-Hsuan Lu, Bellevue, WA (US); Ming-Chieh Lee, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 22 days.

(21) Appl. No.: 13/371,478

(22) Filed: Feb. 13, 2012

(65) Prior Publication Data

US 2013/0208075 A1    Aug. 15, 2013

(51) Int. Cl.
H04N 7/14    (2006.01)
(52) U.S. Cl.
USPC .................................. 348/14.12; 348/14.08
(58) Field of Classification Search
USPC .............. 379/93.21, 158, 202.01; 348/14.01, 348/14.12, 14.08, 14.11
See application file for complete search history.

(56) References Cited

U.S. PATENT DOCUMENTS 8,380,790 B2 * 2/2013 Lee et al. .................... 709/205
2011/0310216 A1 * 12/2011 Lee et al. .................. 348/14.08

OTHER PUBLICATIONS

"Knapsack problem," web page downloaded from www.wikipedia.com on Nov. 24, 2011.

"List of knapsack problems," web page downloaded from www.wikipedia.com on Nov. 25, 2011.

Maydell, Ursula et al., "A Practical Method to Optimize Negotiable Call Accesses for Broadband Communication Networks," article, 1993, pp. 92-99, IEEE, Dept. of Computing Science, Univ. of Alberta, Edmonton, Alberta, Canada.

Sundaram, "Multirate Media Streaming Using Network Coding", Proceedings of the 43rd Annual Allerton Conference on Communication. Control and Computing, Sep. 28-30, 2005.

* cited by examiner

Primary Examiner — Olisa Anwah
(74) Attorney, Agent, or Firm — Andrew Smith; Jim Ross; Micky Minhas (57) ABSTRACT Optimization of conference call encoding processes is provided. A first client of a multi-party conference call may receive client capability data, including video scalability support, from each of the other clients to the conference call. Based on the client capability data and the transmission capabilities of the first client, including video scalability support, the first client may determine a total number of data streams and properties for each data stream, such that the total number of data streams and the plurality of properties for each data stream are optimized and supported by the respective client capability data and the transmission capabilities. Subsequently, the first client generates one or more data streams according to the total number of data streams and the properties that were determined for each data stream and transmits the one or more data streams to the other clients of the conference call.

20 Claims, 6 Drawing Sheets

ENCODING PROCESSING FOR CONFERENCING SYSTEMS

TECHNICAL FIELD

The technical field relates generally to telecommunications and, more specifically, to conferencing systems operating over telecommunications networks.

BACKGROUND

Multi-party audio and/or video conference calls can involve participants or clients with a wide variety of preferences and capabilities. A client using a mobile phone to connect to the conference, for example, may have a low uplink and downlink bandwidth and support only low frame rate video. On the other hand, a client connecting to the conference using a desktop computer on a corporate intranet may have a high uplink and downlink bandwidth and support a high frame rate. A mobile phone client may, for example, only be able to encode and receive video at Common Intermediate Format (CIF) resolution (e.g., 320 by 240 pixels per frame) with a frame rate of 15 frames per second (fps), while the intranet client may be able to encode and play back video at Video Graphics Array (VGA) resolution (e.g., 640 by 480 pixels) with a frame rate of 30 fps. Consequently, the mobile phone client may not be able to send or receive the same quality video stream as the intranet client.

The conventional solution to the aforementioned problem involves degrading the video quality for all participating clients to a maximum level that the lowest performing client can handle. That is, the conferencing system may force a higher-capability client to compromise and sacrifice its conferencing capabilities by encoding/receiving video streams with a lower resolution and a lower frame rate as compared to a resolution and frame rate the higher-capability client can handle. Although this approach provides a system solution that supports lower-capability clients, the higher-capability clients are left with a sub-par conferencing experience that is below their abilities. Further, this approach is not optimally efficient since it leaves a certain amount of processing power and bandwidth unused.

SUMMARY

Optimization of conference call encoding processes is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a method of providing optimization of conference call encoding processes is provided that solves the above-described problem of serving audio and/or video to conference call clients with varying capabilities. A first client of a multi-party conference call may receive client capability data, including video scalability support, from each of the other clients to the conference call. Based on the client capability data and the transmission capabilities of the first client, including video scalability support, the first client may determine a total number of data streams and properties for each data stream, such that the total number of data streams and the plurality of properties for each data stream are optimized and supported by the respective client capability data and the transmission capabilities. Subsequently, the first client generates one or more data streams according to the total number of data streams and the properties that were determined for each data stream and transmits the one or more data streams to the other clients of the conference call.

BRIEF DESCRIPTION OF THE DRAWINGS

The accompanying drawings, which are incorporated in and constitute a part of this disclosure, illustrate various example embodiments. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Disclosed methods provide optimization of conference call encoding processes. The term conference call, as used herein, shall denote any type of telecommunication connection between parties wherein audio and/or video data is exchanged between parties of the conference call. One or more data streams, including audio and/or video data, are transmitted to receiving clients based on the sending client's ability to encode and transmit the data and the receiving clients' abilities to receive and process the data, while optimizing use of the available bandwidth and processing resources.

Figure 1:
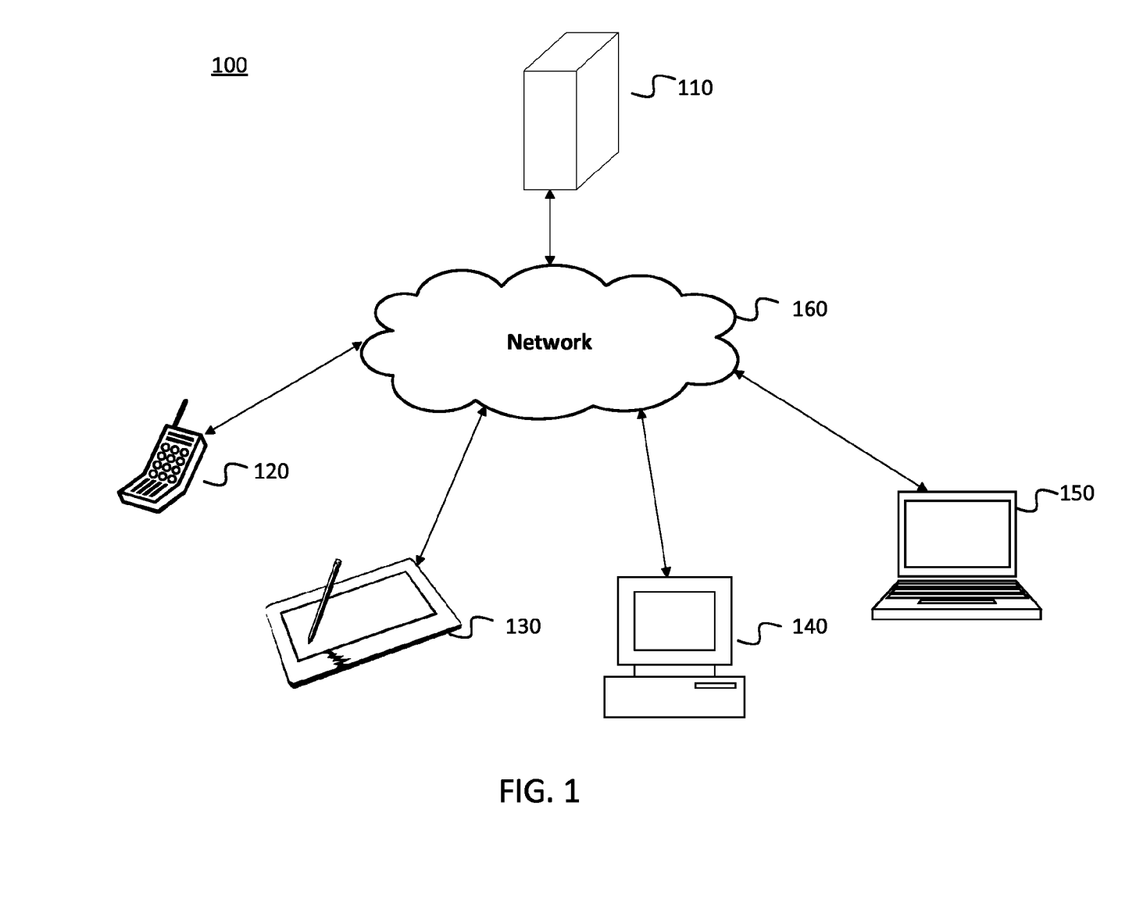
FIG. 1 is a block diagram of an operating environment that supports conference calls, according to an example embodiment.

FIG. 1 shows a block diagram of an operating environment 100 that supports conference calls, according to an example embodiment. The conference call environment 100 may comprise multiple conference call participants or clients 120, 130, 140, 150 and a conference server 110 communicating via a communications network 160. Each of the clients 120, 130, 140, 150 and conference server 110 may be connected either wirelessly or in a wired or fiber optic form to the communications network 160. Clients 120, 130, 140, 150 and conference server 110 may each comprise a computing device 600, described below in greater detail with respect to FIG. 6. FIG. 1 shows that clients 120, 130, 140, 150 may comprise a desktop computer, laptop, tablet computer or smart phone, for example. Communications network 160 may be a packet switched network, such as the Internet, or any local area network, wide area network, enterprise private network or the like.

Conference call environment 100 may be used when multiple clients want to share data streams amongst each other. Each client may connect directly to conference server 110. The conference server 110 may receive and distribute a list of which clients are connected and what are each client's preferences and capabilities, which can include descriptions of uplink and download bandwidth, resolution preferences and restrictions, frame rate preferences and restrictions, video scalability supported and loss rate. Hereinafter, the term capability shall be used to refer to both preferences and capabilities, or constraints, associated with the computing device of a client.

Subsequently, conference server 110 may, from time to time (e.g., periodically), update to reflect any changes in the clients' capabilities. For example, conference server 110 may analyze the network connection of client 150 and determine that client 150 may have more bandwidth available than previously determined Conference server 110 may distribute that information for use by other clients in facilitating data sharing. Conference server 110 may further be responsible for receiving data streams from the clients and for processing and re-sending those data streams to the other clients. As known in the art and as used herein, a data stream may refer to a sequence of digitally encoded coherent signals (data packets) used to transmit or receive audio and/or video data.

Each client may encode, using an encoder, at least one data stream to send to conference server 110. For example, in the case of a video conference call, each client may have an audio/video input such as a webcam and/or microphone connected to the client. The input may be used to generate one or more data streams (including audio and video data) and encode the data stream before sending the data stream to conference server 110. The process of determining how many data streams an encoder will produce and the properties of each data stream is described in greater detail below with reference to FIG. 5. Conference server 110 may receive encoded data streams from each client, process the encoded data streams and decide which encoded data streams to relay to each client. For example, client 150 may encode a data stream as a series of video frames and send the encoded data stream to conference server 110. The conference server 110 may receive the encoded data stream, process the encoded data stream and send the data stream to clients 120, 130 and 140. As a final point, each client may have the ability to decode the data stream(s) received from the conference server 110 and play or display the audio and/or video information embedded in the data stream(s).

Figure 2:
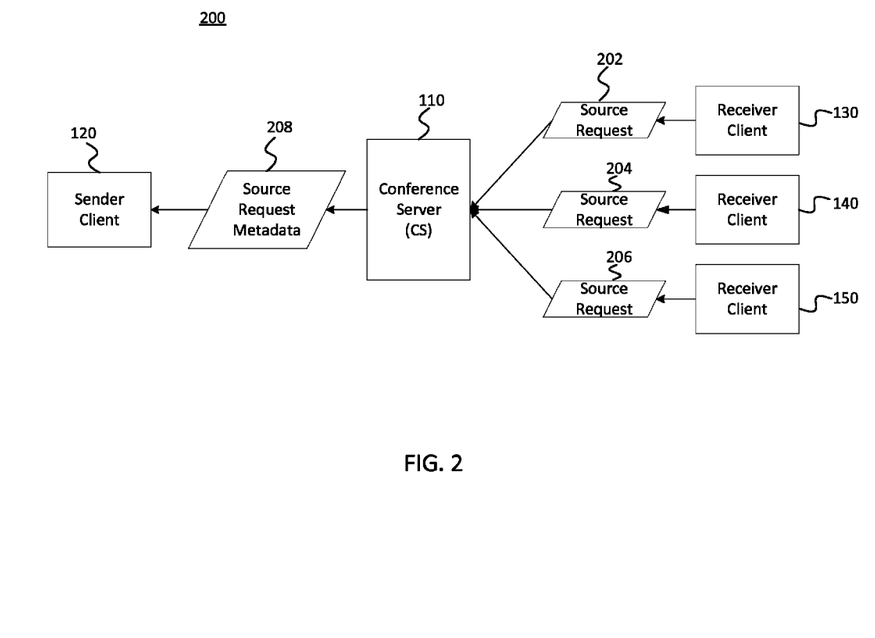
FIG. 2 is a diagram showing the data flow of a capability data collection process, according to an example embodiment.

FIG. 2 illustrates a diagram showing the data flow of an example capability data collection process 200, according to an example embodiment. As explained above, conference server 110 may receive and distribute data pertaining to each client's capabilities—hereinafter referred to as capability data. Further, on an ongoing basis, conference server 110 may update changes in the clients' capabilities in facilitating the data sharing. Although the system supports the distribution of client capability data among all of the clients in a conference call, for example purposes only, FIG. 2 depicts the transfer of client capability data from clients 130, 140 and 150 (designated as receivers of a data stream) to client 120 (designated as a sender of data stream). Note that although FIG. 2, by way of example, designates client 120 as a sender of a data stream and clients 130, 140 and 150 as receivers of a data stream, the system supports the sending and receiving of data streams from any client to any other client.

FIG. 2 shows that prior to, or during, a conference call session, one or more receiver clients 130, 140 and 150 each send a request (requests 202, 204 and 206, respectively), or source request, to conference server 110 via the network 160. A source request may include capability data for a client, including data pertaining to reception, processing and display of data, such as: the downlink or download bandwidth (usually quantified in bits per second) of the client, the frame rate (usually quantified in frames per second) supported by the client, the resolution (usually quantified in units of pixels by pixels) supported by the client, whether video scalability is supported by the client, and the loss rate of the client. A client may transmit a source request to the conference server 110, for example, in the context of a Real-Time Transport Control Protocol (RTCP) formatted message before or during a conference call session. RTCP is a sister protocol for the Real-Time Transport Protocol (RTP) and provides out-of-band statistics and control information for an RTP data flow.

Video scalability may refer to the encoding of a video data stream that also contains one or more subset video data streams. A subset video data stream is derived by dropping packets from the larger video data stream to reduce the bandwidth required to transmit the subset video data stream. The subset video data stream can represent a lower spatial resolution (smaller screen), lower temporal resolution (lower frame rate), or lower quality video signal. Scalable Video Coding (SVC) is one example of a video scalability standard used in conjunction with the H.264/MPEG-4 video compression standard. When a video data stream has been encoded using video scalability processes, the video data stream can be said to include video scalability encoding. Similarly, when a sending client has the capability to generate a video data stream including video scalability encoding, or when a receiving client has the capability to receive and decode a video data stream having video scalability encoding, said client (sender or receiver) can be said to include video scalability support.

The loss rate of a client refers to the average number of bits that are lost during transfer of data to the client. Many communication channels are subject to channel noise, and thus errors may be introduced during transmission from the source to the receiver client. The loss rate of a client is used to calibrate forward error correction routines, as described more fully below.

FIG. 2 shows the conference server 110 receiving the source requests 202, 204 and 206 from receiver clients 130, 140 and 150, respectively. Subsequently, the conference server 110 produces the metadata 208 (i.e., source request metadata 208 of FIG. 2) based on the source requests and transmits the metadata 208 to the sender client 120. As used herein, the term metadata refers to data providing information about one or more aspects of other data, namely, the data included in the source requests 202, 204 and 206.

The metadata 208 may include at least the data that is included in the source requests 202, 204 and 206. In one embodiment, the metadata 208 further includes a summary of the data included in the source requests 202, 204 and 206 organized by capabilities, such that receiver clients with identical or similar capabilities are grouped together. In another embodiment, the metadata 208 further includes data that can be formatted into at least one histogram or table that shows the distribution of receiver clients according to certain capability values, such as the download bandwidth in bit rate units. In yet another embodiment, the metadata 208 further includes data that can be formatted into at least one bitmap or lookup table for each client describing the range of values supported by that client for a particular capability, such as frame rate or resolution.

Figure 3:
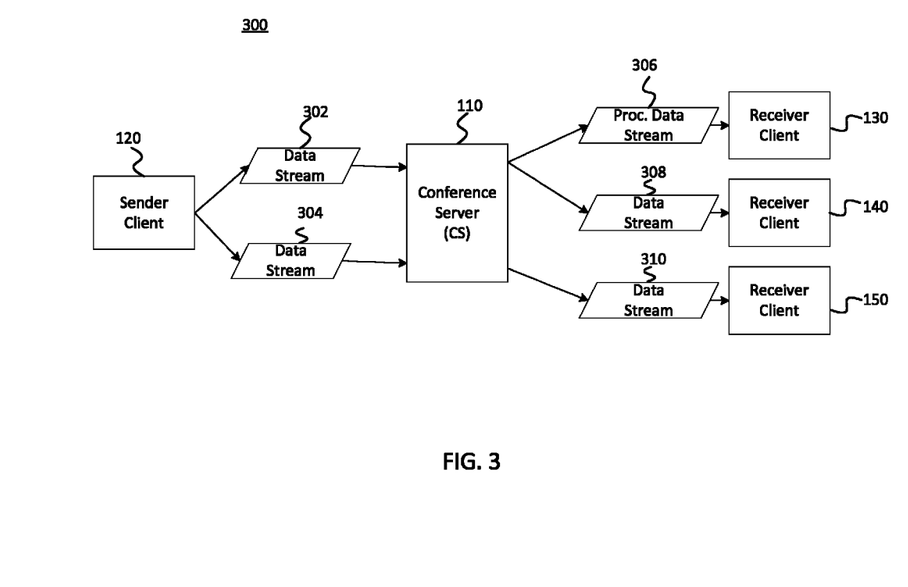
FIG. 3 is a diagram showing the data flow of a data stream transmission process, according to an example embodiment.

FIG. 3 depicts a diagram showing the data flow of an example data stream transmission process 300, according to an example embodiment. Like FIG. 2, FIG. 3 depicts, for example purposes only, data stream transmission from client 120 (designated as a sender of a data stream) to clients 130, 140 and 150 (designated as receivers of the data stream). As explained above, a sender client 120 may encode at least one data stream to send to conference server 110, which processes the data stream(s) and sends the data stream(s) to the receiver clients 130, 140 and 150. In the case of a video conference, a data stream may be encoded as a series of video frames wherein each frame may comprise a single image. Each frame may be represented by bits of data. The data stream may be encoded so that not every bit of data in every frame must be transmitted in order to represent the source of the data stream. Different frame types may be used to encode and/or compress the data stream. Frame types may comprise, for example, I-frames, P-frames, and B-frames.

A client, such as sender client 120, can perform the encoding process using an encoder, which may include a hardware device, circuit, transducer, software program, or algorithm that captures, compresses and converts audio and/or video information from one format or code to another, for the purposes of standardizing the transmission of the data. Note that a client may include more than one encoder, which is shown as an encoder program module 607 in device 600 of FIG. 6, according to one embodiment. Each encoder may produce one or more data streams. The process of determining how many data streams an encoder will produce and the properties of each data stream is described in greater detail below with reference to FIG. 5.

By way of example, FIG. 3 shows that sender client 120 uses an encoder to produce two data streams 302, 304, which are transmitted to conference server 110. The encoder of sender client 120 may employ the use of a video scalability standard, such as SVC, to reduce the number of data streams that are generated and transmitted. The conference server 110 receives the two data streams 302, 304 and may process the data streams according to the capabilities of the receiver clients 130, 140 and 150, as described more fully below. As a result of the processing performed by the conference server 110, the data stream 302 is split into two data streams 306, 308, while data stream 304 is passed through in an unprocessed manner as data stream 310.

Consistent with embodiments described herein, conference server 110 may employ video scalability standard processes to alter or divide a data stream before sending it to one or more receiver clients. For example, receiver client 140 may support video at 30 frames per second, while receiver client 130 may have the same capabilities as receiver client 140, except that it only supports video at 15 frames per second. In this case, sender client 120 may transmit to conference server 110 a data stream 302 that meets the higher capabilities of client 140. Consequently, conference server 110 may relay the data stream 302 unaltered to receiver client 140 as data stream 308. The conference server 110 may also copy the data stream 302 and, using video scalability processing, produce a processed data stream 306, wherein every other frame is dropped. Processed data stream 306, therefore, possesses the same properties as data stream 308, except that processed data stream 306 includes video at a frame rate of 15 frames per second, which meets the capabilities of receiver client 130. Consequently, with the aid of the conference server 110, the sender client 120 may use a single data stream 302 to service two receiver clients (130, 140) having different capabilities.

In addition to frame rate adjustments of a data stream as described above, video scalability encoding standard processes also support adjustments to picture size and quality. With regard to adjustments to picture size, the initial data stream received from sender client 120 may be encoded at multiple resolutions. Consequently, the conference server 110 may divide the initial data stream into two or more data streams having different resolutions. With regard to adjustments to picture quality, the initial data stream received from sender client 120 may be encoded at a single resolution but at different picture qualities. Accordingly, the conference server 110 may divide the initial data stream into two or more data streams having different picture qualities.

Subsequent to receiving and processing the data streams received from the sender client 120, the conference server 110 sends data streams 306, 308, 310 to the receiver clients 130, 140 and 150, respectively. Finally, each receiver client 130, 140, 150 receives a data stream, which is decoded and displayed at the respective receiver client. A client, such as receiver client 130, performs the decoding process using a decoder, which may include a hardware device, circuit, transducer, software program, or algorithm that receives encoded audio and/or video data and converts it to a format wherein the data that can be played or displayed for a user. A client's video decoder is shown as a decoder program module 608 in device 600 of FIG. 6, according to one embodiment.

Figure 4:
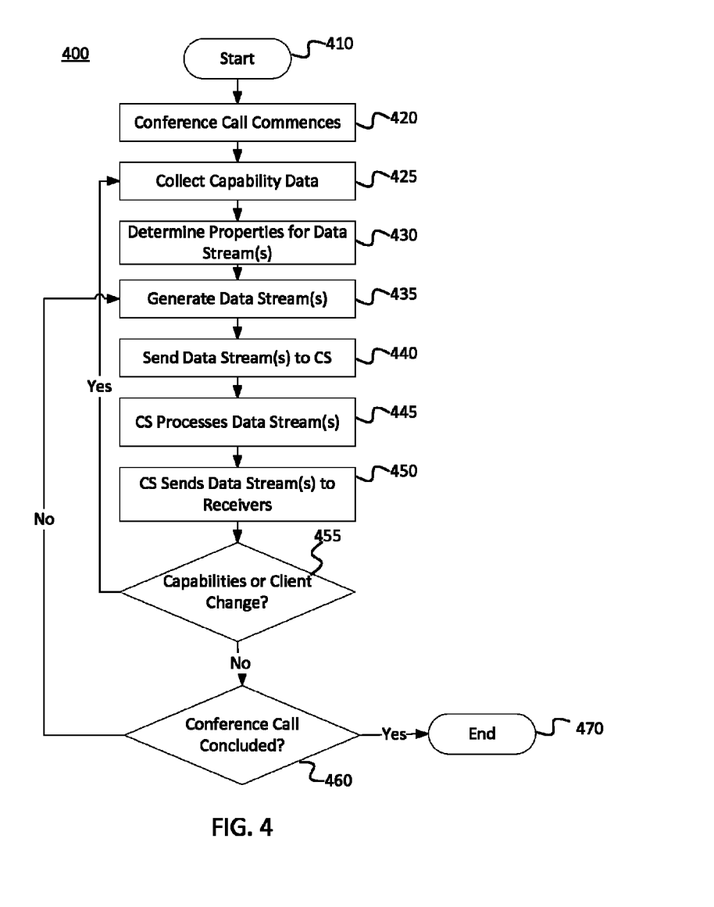
FIG. 4 is a flow chart of a method for providing conference call services, including conference call encoding processes, according to an example embodiment.

FIG. 4 shows a flow chart setting forth the general stages involved in an example method 400 for providing conferencing services, including conference encoding processing, according to an example embodiment. Method 400 may be implemented by the various entities described in FIG. 1, such as conference server 110 and clients 120, 130, 140 and 150. An example implementation of the stages of method 400 will be described in greater detail below. Like FIG. 3, FIG. 4 depicts, for example purposes only, data stream transmission from one sender client, such as client 120, to multiple receiver clients, such as receiver clients 130, 140 and 150.

Method 400 may begin at starting block 410 and proceed to stage 420 wherein a conference call commences. A conference call may commence when at least one client, such as one or more of the clients 120, 130, 140 and 150, register with the conference server 110. For example, the client(s) may be operatively connected to conference server 110 via a network connection and may request participation in a conference call hosted by conference server 110.

From stage 420, method 400 may advance to stage 425 wherein conference server 110 may collect capability data from each registered client. As explained above, one or more receiver clients, such as clients 130, 140 and 150 can each send a source request to conference server 110, wherein the source request may include capability data for each client, such as: the download bandwidth, the frame rate supported by the client, the resolution supported by the client, the video scalability type supported by the client and the loss rate of the client. The conference server 110 may receive the source requests, produce metadata 208 based on the data in the source requests, and send the metadata 208 to the sender client 120. The metadata 208 may include at least the data that is included in the source requests of the receiver clients.

In stage 430, the sender client 120 may determine the data stream properties for at least one data stream to be generated based on: (i) the capability data of the receiver clients, which were received in the metadata 208, and (ii) the capabilities of the sender client 120. The process of stage 430 is described in greater detail below with reference to FIG. 5.

The capabilities of the sender client 120, also referred to as transmission capabilities, may include the number of encoders of sender client 120, the encoder processing capability or capacity of each encoder, usually quantified as the maximal macroblock processing rate (i.e., width in macroblocks times height in macroblocks times frames per second), and the uplink, or upload, bandwidth of the sender client, usually quantified in bits per second. The capabilities of the sender client 120 may further include the frame rate of the source video produced at the sender client 120 and the resolution of the source video. In the case of a video conference call, the properties of a data stream may include a resolution, a frame rate, a required bit rate of the data stream and whether video scalability is employed.

In summary, the data inputs for the determination of stage 430 can comprise: a) the capability data representing the capabilities of the receiver clients (i.e., download bandwidth, resolution, frame rate, video scalability support, etc.) and b) the data representing the capabilities of the sender client (i.e., the number of encoders, the processing capability of each encoder, uplink bandwidth, video source resolution, video source frame rate, video scalability support, etc.), while the data outputs of the stage 430 can comprise: a) a whole number representing a total number of data streams to generate and b) a set of properties for each data stream (i.e., required bit rate, resolution, frame rate, video scalability support and an identity of which encoder will produce each data stream).

From stage 430, method 400 may advance to stage 435 where the one or more encoders of sender client 120 may generate one or more data streams based on the determinations of stage 430, which determined the properties for each generated data stream. From stage 435, method 400 may advance to stage 440 wherein sender client 120 may transmit the one or more data streams generated in stage 435 to the conference server 110.

From stage 440, method 400 may advance to stage 445 wherein the conference server 110 may process the one or more data streams received from sender client 120 according to the capabilities of the receiver clients 130, 140 and 150. As explained above with reference to FIG. 3, conference server 110 may alter or divide a data stream before sending it to a receiver client. For example, conference server 110 may receive a high frame rate data stream that meets the capabilities of a first receiver client but exceeds the capabilities of a second receiver client. Assuming all other properties of the data stream are supported by the first and second receiver client, using a video scalability standard such as SVC, conference server 110 may relay the high frame rate data stream unaltered to the first receiver client, but conference server 110 may also copy the high frame rate data stream and produce a processed data stream wherein a certain number of frames are dropped, thereby producing a data stream with a lower frame rate and meeting the lower capabilities of the second receiver client.

From stage 445, method 400 may advance to stage 450 wherein the conference server 110 may send the data stream(s) it has received and processed in stage 445 to the receiver clients 130, 140 and 150. The receiver clients subsequently receive the data streams, which may be decoded and played or displayed at the respective receiver clients.

From stage 450, method 400 may advance to stage 455 wherein it may be determined whether the capabilities of the receiver clients have changed, whether the receiver list of clients participating in the conference call have changed and/or whether the capabilities of the sender client have changed.

Consistent with further embodiments, conference server 110 and/or the sender client 120 may re-evaluate the capabilities of the receiver clients and/or the sender client 120, as well as the presence of the receiver clients in the conference call, and dynamically alter the number and type of data streams transmitted from sender client 120, since such changes may alter the determination of stage 430. For example, conference server 110 and/or the sender client 120 may determine that the downlink bandwidth available to receiver client 150 has dropped from 3 Mbps to 500 Kbps and sender client 120 may begin sending the CIF resolution data stream instead of the VGA resolution data stream to receiver client 150. In another example, second receiver client 140 may be the only client receiving the HD resolution data stream at a high bit rate from sender client 120. If receiver client 140 drops out of the conference call, sender client 120 may stop encoding and sending a high bit rate HD resolution data stream, which would free up processing and bandwidth resources that can be dedicated to other receiver clients still present in the conference call.

It should be noted that although FIG. 4 shows stage 460 occurring in sequence after stage 455, both stages 455 and 460 may occur either periodically or in response to triggering events, and both stages 455 and 460 may occur in parallel or in another thread from the steps of method 400. Stage 455, for example, may occur at predefined time intervals or may occur solely in response to detected changes in the capabilities of the clients or in response to the detection of clients joining or leaving the conference call. Stage 460, for example, may also occur at predefined time intervals or may occur solely in response to the detection of clients leaving the conference call.

If the determination of stage 455 is affirmative, then control flows back to stage 425 wherein client capability data may be collected once more and the subsequent stages of method 400 are executed. In one embodiment, if the determination of stage 455 is affirmative, then control flows back to stage 425 wherein client capability data may be collected solely from those clients whose capabilities have changed since the initial determination of stage 430.

If the determination of stage 455 is negative, then control flows to stage 460 where it may be determined whether the conference call is concluded. If the determination of stage 460 is negative, then control flows back to stage 435 wherein the data stream(s) continue to be generated and the subsequent stages of method 400 are executed. If the determination of stage 460 is affirmative, then control flows to stage 470 wherein the method 400 is concluded.

Figure 5:
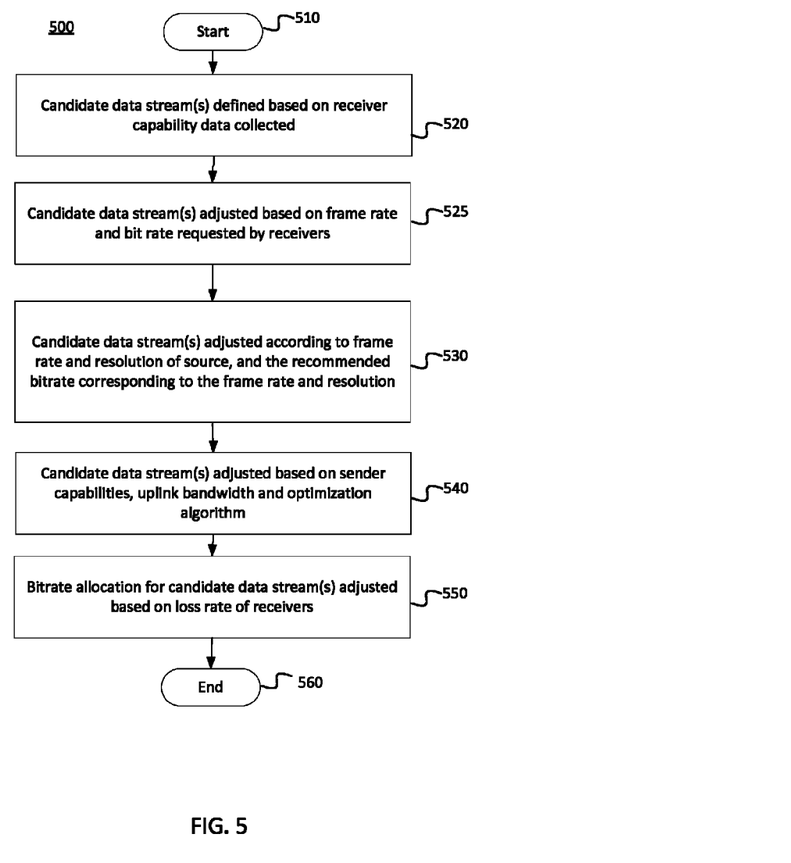
FIG. 5 is a flow chart of a method for optimizing conference call encoding processes, according to an example embodiment.

FIG. 5 shows a flow chart setting forth the general stages involved in an example method 500 for optimizing encoding processes for conference calls, according to an example embodiment. Note that method 500 provides greater detail about the process 430 of FIG. 4. Method 500 may be implemented using a computing device 600 as described in more detail below with respect to FIG. 6. An example implementation of the stages of method 500 will be described in greater detail below. Like FIG. 4, FIG. 5 depicts, for example purposes only, optimization routines for conference call encoding processes being executed by a sender client sending one or more data streams to multiple receiver clients, such as 130, 140 and 150. The term optimization, as used herein, refers to efforts to make the most effective use of all conference call resources—including uplink and downlink bandwidth, encoder and decoder processing resources, etc.—so as to produce to highest possible conference call experience for all receiver clients.

Method 500 may begin at starting block 510 and proceed to stage 520 wherein a first set of one or more candidate data streams is defined based on the receiver client capability data. Stage 520 entails defining a set of properties for one or more data streams. The properties for a data stream may include, but is not limited to, resolution, frame rate, required bit rate and video scalability support. In stage 520, the sender client 120 may, for example, define one data stream for each receiver client, wherein the data stream allotted for a client is defined such that it can be supported by the client's capabilities. In stage 520, the sender client 120 may further merge defined data streams corresponding to receiver clients with identical capabilities, so as to eliminate redundancy and reduce the number of candidate data streams.

From stage 520, method 500 may advance to stage 525 wherein the sender client 120 may adjust and reduce the candidate data streams based on certain receiver client capabilities. Recall that sender client 120 received metadata 208, which may include a table that shows the distribution of receiver clients according to certain capability values, such as the download bandwidth in bit rate units. Also recall the sender client 120 may receive a bitmap or lookup table for each receiver client describing the range of values supported by that client for a particular capability, such as frame rate or resolution.

In stage 525, sender client 120 may review the lookup table associated with each receiver client and modify one or more properties of the candidate data streams according to the range of values in the lookup table, so as to reduce the number of candidate data streams. For example, the candidate data streams may include a first stream with a 30 fps frame rate that corresponds to receiver client 130, and a second stream with a 15 fps frame rate that corresponds to receiver client 140. In this example, the data in the lookup table associated with receiver client 140 may specify that the client 140 may be served with a 30 fps frame rate data stream that includes video scalability encoding, assuming the conference server 110 processes the data stream as outlined above with reference to FIG. 3. Assuming all other properties of the first and second candidate data streams are identical, in stage 530 the sender client 120 may produce a single data stream at 30 fps, wherein the data stream includes video scalability encoding that allows a conference server 110 to split the data stream into two data streams—a first data stream at 30 fps intended for client 130 and a second data stream at 15 fps for client 140, as described more fully above with reference to FIG. 3. Consequently, the sender client 120 may reduce the number of candidate data streams by serving both clients 130 and 140 with the same data stream.

Further in this embodiment of stage 525, sender client 120 may review the table that shows the distribution of receiver clients according to certain capability values, and modify the properties of the candidate data streams according to the table, so as to reduce the number of candidate data streams. For example, the table may show more than one receiver client has requested a data streams at a 1 Mbps bit rate. Assuming all other capabilities of the more than one receiver clients are identical, the more than one receiver clients may be served by one candidate data stream at a 1 Mbps bit rate, so as to reduce the number of candidate data streams. As a further example, the table may show a first receiver client has requested a data stream at a 1 Mbps bit rate and a second receiver client has requested a data stream at a 200 Kbps bit rate. Because the two requested bit rates are relatively far apart, the sender client 120 cannot serve the two clients with the same data stream, because doing so would be too far below or too far above the capabilities of one of the clients and would negatively affect the conference call experience.

As a last example, the table may show a first receiver client has requested a data stream at a 1 Mbps bit rate and a second receiver client has requested a data stream at a 900 Kbps bit rate. Because the two requested bit rates are relatively close in value, assuming all other capabilities of the two receiver clients are identical, the sender client 120 may serve the two clients one candidate data stream at the lower bit rate value (900 Kbps bit rate), so as to reduce the number of candidate data streams. Because the two requested bit rates are relatively close in value, the conference call experience of the client requesting the 1 Mbps bit rate data stream would not be substantially affected by a 900 Kbps bit rate data stream.

From stage 525, method 500 may advance to stage 530 wherein the sender client 120 adjusts the candidate data streams based on certain sender client capabilities and recommended bit rates. Specifically, in stage 530 sender client 120 may reduce the frame rate and/or resolution of the candidate data streams to match the frame rate of the source video produced at the sender client 120 and/or to match the resolution of the source video.

Further in stage 530, once adjustments to frame rate and/or resolution have occurred, candidate data streams may be left with bit rates that exceed the bandwidth necessary to transmit the data stream. For example, a candidate data stream that was initially defined at an HD resolution and a 2.5 Mbps bit rate may have been reduced to a VGA resolution video stream earlier in stage 530. A VGA resolution data stream, however, doesn't require a 2.5 Mbps bit rate. Consequently, the sender client 120 may also reduce the bit rate of the candidate data stream to 500 Kbps, which may be adequate to support the VGA resolution data stream.

To aid in the performance of stage 530, the sender client 120 may compare the properties of a candidate data stream, whose frame rate or resolution has been reduced, with a table that defines the recommended bit rates that correspond to each frame rate and/or resolution value. Using this table, the sender client 120 may identify an adequate reduced bit rate for a candidate data stream whose frame rate or resolution has been reduced. To the extent the reductions defined above result in identical candidate data streams, the sender client 120 may further merge defined data streams, so as to eliminate redundancy and reduce the number of candidate data streams.

It should be noted that the candidate data streams from which the client 120 chooses in step 530 can be the original set of candidate data streams defined in stage 520 above, the adjusted set of candidate data streams (i.e., with downgraded frame rate, resolution, etc.) defined after stage 525 above, a further adjusted or downgraded set of candidate data streams based on any of the aforementioned sets, or any combination of the above sets.

From stage 530, method 500 may advance to stage 540 wherein the sender client 120 may adjust and reduce the candidate data streams based on sender client capabilities and an encoding algorithm. In stage 540, the sender client 120 determines which of the candidate data streams to generate and send to the receiver clients, while abiding by the sender client capabilities. Consequently, state 540 generates one or more candidate data streams that may be optimized for one or more of the receiver clients. It should be noted that the candidate data streams from which the client 120 chooses in step 540 can be the original set of candidate data streams defined in stage 520 above, the adjusted set of candidate data streams defined after any of the stages 525-530 above, a further adjusted or downgraded set of candidate data streams based on any of the aforementioned sets or any combination of the above sets.

The objective of the calculation of stage 540 is to select a subset of the candidate data streams so as to optimize total profit p, while abiding by the maximum macroblock processing rate W and the maximum uplink (or upload) bandwidth bit rate B constraints. The first constraint W of the calculation is the encoding capability or capacity of the encoder of sender client 120, quantified as the maximum macroblock processing rate. The second constraint B is the maximum uplink bandwidth of sender client 120.

The encoder of sender client 120 can generate and send N data streams, with each data stream $x_i$ ($1 \leq i \leq N$) having an associated profit $p_i$, bit rate $b_i$, and encoding cost $w_i$, in units of macroblocks per second. The profit variable p may be a real number that represents the conference call experience of a receiver client. Higher bit rate and higher resolution data streams, for example, have higher profit values, since they result in a higher quality conference call experience for a receiver client.

In an example embodiment, the mathematical form of the calculation of stage 540, in the case where the sender client 120 includes only one encoder, can be written as:
Maximize $$\sum_{i=1}^{N} p_i x_i$$

subject to $$\sum_{i=1}^{N} w_i x_i \leq W \text{ and } \sum_{i=1}^{N} b_i x_i \leq B$$

$$x_i \in \{0, 1\}, \text{ for all } 1 \leq i \leq N$$

wherein profit $p_i$ is the profit associated with a stream $x_i$; wherein encoding cost $w_i$ is the encoding cost (quantified as a macroblock processing rate) associated with a data stream $x_i$; and wherein bit rate $b_i$ is the bandwidth (in bits per second) associated with a data stream $x_i$. Note that the above formulation dictates that each candidate data stream is either selected or not selected (i.e., $x_i \in \{0,1\}$) by the calculation of stage 540, so as to maximize total profit. Recall that the candidate data streams from which selection is made in the calculation of step 540 can be the original set of candidate data streams defined in stage 520 above, the adjusted set of candidate data streams defined after any of the stages 525-530 above, a further adjusted or downgraded set of candidate data streams based on any of the aforementioned sets or any combination of the above sets.

In the case where the sender client 120 includes multiple encoders K, each of which can generate and send up to k data streams, the mathematical form of the calculation of stage 540 is described below, in an example embodiment. The calculation in this case involves K+1 steps wherein the steps 1 through K involves calculating an optimal subset of candidate data streams (as they exist after any of the stages 520-530, or any union of the aforementioned sets) that maximizes overall profit of the conference call, with the assumption of unlimited uplink bandwidth B. The last step K+1 involves calculating an optimal subset of candidate data streams, out of the data streams selected from the previous K steps, such that the aggregate bit rate of the selected data streams does not exceed the maximum uplink bandwidth B.

More specifically, assuming that the encoding capability of encoder k is denoted as $W_k$ (quantified as a macroblock processing rate), the mathematical form of the calculation for the k-th stage ($k \leq K$) is:
Maximize $$\sum_{i=1}^{N} p_i x_i^{(k)}$$

subject to $$\sum_{i=1}^{N} w_i x_i^{(k)} \leq W_k$$

$$x_i^{(k)} \in \{0, 1\} \setminus \left(\left(\bigcup_{j=1}^{k-1} x_i^{(j)}\right) \cap \{1\}\right), \text{ for all } 1 \leq i \leq N$$

Assuming that the encoding capability of encoder k is denoted as $W_k$ (quantified as a macroblock processing rate), the mathematical form of the calculation for the last step K+1 is:
Maximize $$\sum_{i=1}^{N} p_i x_i^{(K+1)}$$

subject to $$\sum_{i=1}^{N} b_i x_i^{(K+1)} \leq B$$

$$x_i^{(k+1)} \in \{0, 1\} \setminus \left(\left(\bigcup_{j=1}^{K} x_i^{(j)}\right) \cap \{1\}\right), \text{ for all } 1 \leq i \leq N$$

Note that the above formulation dictates that each candidate video stream is either selected or not selected (i.e., $x_i^{(k+1)} \in \{0,1\}$) by the calculation of stage 540, so as to maximize total profit. It should also be noted that unlike the calculation for instances where the sender client 120 includes only one encoder, as defined above, the calculation for instances where the sender client 120 includes multiple encoders K is fragmented into at least two discrete steps wherein the constraint for encoder processing capability is resolved in the first discrete step and the constraint for uplink bandwidth is resolved in the second discrete step. The separation of the aforementioned calculation into two discrete steps reduces the processing burden in performing the calculation. As such, in one embodiment, in cases where there is only one encoder, the multiple encoder calculation above can be utilized by assuming K=1 (since K represents the number of encoders). This allows the multiple encoder calculation to be utilized for a single encoder situation. Consequently, the use of the multiple encoder calculation imposes a lowered processing burden and may be favored for devices with a lowered processing capability such as a smart phone.

In summary, in stage 540 the sender client 120 identifies one or more of the candidate data streams to generate and send to the receiver clients (as well as the identity of the encoder which will be generating each data stream), while abiding by the sender client capabilities (number of video encoders, processing capability of each encoder, uplink bandwidth, video scalability support, etc.) and optimizing the conference call experience (i.e., "profit") of the receiver clients.

From stage 540, method 500 may advance to stage 550 wherein the sender client 120 may adjust the bit rate allocation in each candidate data stream according to the loss rate of the receiver client that receives that data stream. Recall that loss rate data for each receiver client was collected by the sender client 120 in step 425 of the method 400. The loss rate of a receiver client refers to the average number of bits that are lost during transfer of a data stream to the receiver client. This data is used to calibrate forward error correction in the data stream sent to each receiver client. In stage 550, the sender client 120 determines the portion of each data stream that is allotted to forward error correction bits, according to the receiver client's loss rate, and the portion of the data stream that is allotted for audio and/or video data. At the conclusion of stage 550, the candidate data streams, as defined and modified by the method 500, are deemed the data streams that shall be generated in step 435 of the method 400. From stage 550, method 500 may advance to stage 560 wherein the method 500 concludes.

Figure 6:
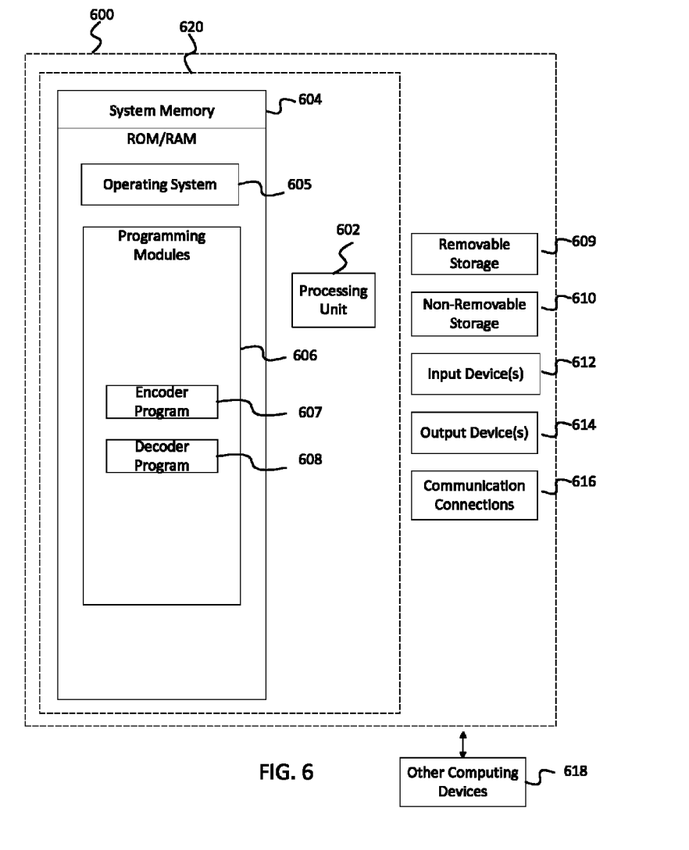
FIG. 6 is a block diagram of a system including a computing device, according to an example embodiment.

FIG. 6 is a block diagram of a system including an example computing device 600 and other computing devices. Consistent with the embodiments described herein, the aforementioned actions performed by clients 120, 130, 140 and 150 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for methods 400 and 500 as described above. Methods 400 and 500 may operate in other environments and are not limited to computing device 600.

With reference to FIG. 6, a system consistent with an embodiment of the invention may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination or memory. System memory 604 may include operating system 605, one or more programming modules 606. Operating system 605, for example, may be suitable for controlling computing device 600's operation. In one embodiment, programming modules 606 may include, for example, an encoder program module 607 module and a decoding program module 608. Furthermore, embodiments of the invention may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. The aforementioned devices are only examples, and other devices may be added or substituted.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. encoder and decoder modules 607 and 608) may perform processes including, for example, one or more of method 400's or method 500's stages as described above. The aforementioned processes are examples, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing one or more data streams to a plurality of clients in a conference call, comprising:
   receiving client capability data, including video scalability support, from one or more of the plurality of clients;
   determining a total number of data streams and a plurality of properties for each data stream based on the client capability data and one or more transmission capabilities, including video scalability support, such that the total number of data streams and the plurality of properties for each data stream are supported by the client capability data and the one or more transmission capabilities;
   generating one or more data streams according to the total number of data streams and the plurality of properties for each data stream that were determined; and
   transmitting the one or more data streams to the plurality of clients.

2. The method of claim 1, wherein receiving client capability data from one or more of the plurality of clients comprises receiving a downlink bandwidth capability one or more of the plurality of clients.

3. The method of claim 2, wherein receiving client capability data from one or more of the plurality of clients comprises receiving a video resolution capability from one or more of the plurality of clients.

4. The method of claim 3, wherein receiving client capability data from one or more of the plurality of clients comprises receiving a video frame rate capability from one or more of the plurality of clients.

5. The method of claim 4, wherein receiving client capability data from one or more of the plurality of clients comprises receiving a data loss rate capability from one or more of the plurality of clients.

6. The method of claim 1, wherein determining a total number of data streams and a plurality of properties for each data stream is further based on at least one of the following transmission capabilities: processing capacity, uplink bandwidth, video source resolution, and video source frame rate.

7. The method of claim 6, wherein determining a total number of data streams and a plurality of properties for each data stream further comprises determining at least one of the following properties for each data stream: bit rate, resolution, and frame rate.

8. The method of claim 7, wherein determining a total number of data streams and a plurality of properties for each data stream is further based on a lookup table that defines a bit rate corresponding to each frame rate and resolution value of a data stream.

9. The method of claim 1, wherein generating one or more data streams further comprises generating at least one data stream that includes video scalability encoding.

10. The method of claim 1, wherein the conference call comprises a video conference call and wherein generating one or more data streams comprises generating one or more data streams that includes audio and video data.

11. The method of claim 1, wherein determining a total number of data streams and a plurality of properties for each data stream further comprises:
   determining a first number of data streams and a plurality of properties for each data stream according to a processing capacity transmission capability; and
   determining the total number of data streams and a plurality of properties for each data stream according to uplink bandwidth, wherein the total number of data streams is based on the first number of data streams.

12. At least one memory storage device storing executable instructions, which, when executed by a computing device, cause the computing device to perform a method for providing one or more data streams to a plurality of clients in a conference call, the method comprising:
   receiving client capability data from one or more of the plurality of clients, wherein client capability data includes downlink bandwidth, video source resolution, video source frame rate, and video scalability support;
   determining a total number of data streams and a plurality of properties for each data stream based on the client capability data and one or more transmission capabilities, such that the total number of data streams and the plurality of properties for each data stream are supported by the client capability data and the one or more transmission capabilities, and wherein transmission capabilities include processing capacity, uplink bandwidth, video resolution, video frame rate, and video scalability support;
   generating one or more data streams according to the total number of data streams and the plurality of properties for each data stream that were determined; and transmitting the one or more data streams to the plurality of clients.

13. The at least one memory storage device of claim 12, wherein receiving client capability data from one or more of the plurality of clients further comprises receiving a data loss rate capability from one or more of the plurality of clients.

14. The at least one memory storage device of claim 12, wherein determining a total number of data streams and a plurality of properties for each data stream further comprises determining at least one of the following properties for each data stream: bit rate, resolution, and frame rate.

15. The at least one memory storage device of claim 14, wherein determining a total number of data streams and a plurality of properties for each data stream is further based on a lookup table that defines a bit rate corresponding to each frame rate and resolution value of a data stream.

16. The at least one memory storage device of claim 15, wherein generating one or more data streams further comprises generating at least one data stream that includes video scalability encoding.

17. The at least one memory storage device of claim 12, wherein the conference call comprises a video conference call and wherein generating one or more data streams comprises generating one or more data streams that includes audio and video data.

18. The at least one memory storage device of claim 12, wherein determining a total number of data streams and a plurality of properties for each data stream further comprises:
   determining a first number of data streams and a plurality of properties for each data stream according to a processing capacity transmission capability; and
   determining the total number of data streams and a plurality of properties for each data stream according to uplink bandwidth, wherein the total number of data streams is based on the first number of data streams.

19. A system for providing one or more video streams to a plurality of clients in a video conference call, the system comprising:
   a memory storage;
   a network connection device; and
   a processing unit coupled to the memory storage, wherein the processing unit is operative to:
   receive client capability data from one or more of the plurality of clients, wherein client capability data includes downlink bandwidth, video resolution, video frame rate, and video scalability support;
   determine a total number of data streams and a plurality of properties for each data stream based on: a) the client capability data, b) one or more transmission capabilities and c) a lookup table that defines a bit rate corresponding to each frame rate and resolution value of a data stream, such that the total number of data streams and the plurality of properties for each data stream are supported by the client capability data and the one or more transmission capabilities, and wherein transmission capabilities include processing capacity, uplink bandwidth, video resolution, video frame rate, and video scalability support;
   generate one or more data streams according to the total number of data streams and the plurality of properties for each data stream that were determined; and
   transmit the one or more data streams to the plurality of clients.

20. The system of claim 19, wherein the system transmits the one or more data streams to a conference server that moderates the video conference call, and wherein the video conference server transmits the one or more data streams to the plurality of clients.

* * * * *